(12) United States Patent
Schantz et al.

(10) Patent No.: US 8,218,924 B1
(45) Date of Patent: Jul. 10, 2012

(54) FIBER OPTIC CABLE WITH A PLURALITY OF OPTICAL EVENTS TO DEFINE A SIGNATURE SPECIFIC TO THE FIBER OPTIC CABLE

(75) Inventors: Howard J. Schantz, Inver Grove Heights, MN (US); Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 450 days.

(21) Appl. No.: 12/432,910

(22) Filed: Apr. 30, 2009

(51) Int. Cl.
*G02B 6/44* (2006.01)
*G02B 6/00* (2006.01)

(52) U.S. Cl. ........................ 385/100; 385/147
(58) Field of Classification Search .......... 385/100–115, 385/147; 340/522
See application file for complete search history.

(56) References Cited

U.S. PATENT DOCUMENTS

| | | | |
|---|---|---|---|
| 6,594,010 B2 * | 7/2003 | Malczewski et al. | 356/311 |
| 7,353,994 B2 * | 4/2008 | Farrall et al. | 235/454 |
| 7,455,591 B2 * | 11/2008 | Nguyen | 463/42 |
| 7,509,008 B2 * | 3/2009 | Perales et al. | 385/100 |
| 7,603,009 B2 * | 10/2009 | Ramos | 385/47 |
| 7,903,907 B1 * | 3/2011 | Park et al. | 385/12 |
| 2004/0257218 A1 * | 12/2004 | Shibata et al. | 340/522 |

OTHER PUBLICATIONS

Secure Detect product brochure (printed from Safeguards Technology LLC website http://www.safeguards.com/product_info/NewFiberOpticCableIDS.pdf on or about Mar. 20, 2010).

* cited by examiner

*Primary Examiner* — Akm Ullah
(74) *Attorney, Agent, or Firm* — Hamre, Schumann, Mueller & Larson, P.C.

(57) ABSTRACT

A fiber optic cable is described that includes a core, a cladding over the core, and a plurality of optical events on at least one of the core and cladding. The plurality of optical events are constructed and arranged to alter a signal transmitted through the cable, where the plurality of optical events define a signature key of the cable. The signature key can be used in various electronic devices and systems, such that a mode of operation is disabled or enabled based on whether the correct fiber optic cable is installed.

19 Claims, 2 Drawing Sheets

FIBER OPTIC CABLE WITH A PLURALITY OF OPTICAL EVENTS TO DEFINE A SIGNATURE SPECIFIC TO THE FIBER OPTIC CABLE

FIELD

This disclosure generally pertains to the field of signal transmission cables, for example, optical cables. More particularly, the disclosure herein relates to a cable keyed with a plurality of optical events on the cable that define a signature specific to the cable.

BACKGROUND

Using an optical event on a signal transmission cable is well known. An optical event is a physical alteration or modification of a cable that imparts a change on a signal transmitted through the cable. Such a change can include reflection and/or power loss of a part of the signal. An optical event can be intended or unintended. Oftentimes, an optical event is intended when a certain wavelength and/or power level of a signal is desired for further processing. For example, a cable can be constructed to intentionally have a certain known optical event, or intentionally be exposed to certain environment and/or installation conditions that would cause the optical event. Some examples of an optical event can include a variation of the refractive index, crimp, etch, bend, break, or other surface treatment of the core and/or cladding of the cable that would cause the change in a signal transmitted through the cable. A common type of optical event is the use of fiber Bragg grating (FBG). One technique used to implement a fiber Bragg grating is the use of a ultra-violet (UV) laser to permanently inscribe a grating, such as along a length of the cable within the cable's core. When a signal is transmitted through the cable, the grating will cause a known wavelength reflection or power loss of a part of the signal. Usually, a fiber Bragg grating must be of such high quality and precision, so as to be suitable to ensure that the desired change to the signal occurs. For example, the inscription of the grating has to be of such specificity and precision so that the portion of the signal's wavelength to be transmitted remains while other portions of the signal's wavelength are removed. Fiber Bragg grating is well known and their operation is well understood. New uses of optical events, such as fiber Bragg grating, may still be found.

SUMMARY

Applicants have found that, by using a plurality of optical events, a signal transmission cable can be keyed with a particular optical event signature. The keyed cable therefore can provide a valuable security function for various devices and/or systems. For example, where replacing the keyed cable with a cable other than the same cable, or at least with a cable other than a cable having the same signature, a certain mode of operation for the device or system will/will not occur. The concepts herein can be used to control enabling/disabling of certain device or system operations, such as but not limited to, power-up or shut-down, regular or degraded operating levels such as standby, transmission of warning or help alerts, and keys for encryption or non-encryption in distribution networks.

Generally, a fiber optic cable in one embodiment is described that includes a core, a cladding over the core, and a plurality of optical events on a surface of or in at least one of the core and cladding. The plurality of optical events are constructed and arranged to alter a signal transmitted through the cable, where the plurality of optical events define a signature key of the cable.

In one embodiment, the plurality of optical events is embedded on an inner surface of the core.

In one embodiment, the plurality of optical events comprises a plurality of fiber Bragg gratings.

In one embodiment, the signature key is defined by a signal reflected by the plurality of optical events.

As described in the above concept, the signature key can be used in various electronic devices and systems, such that a mode of operation can be enabled or disabled based on whether the correct fiber optic cable is installed.

DETAILED DESCRIPTIONS

The figures herein generally describe a signal transmission cable that has a plurality of optical events on the cable so that the cable is keyed with a particular optical event signature. The keyed cable can be implemented with various devices and systems to provide a valuable security function. The keyed cable with its signature, for example, protects against the replacement of the keyed cable with a cable other than the same keyed cable. If the keyed cable is replaced with a cable that does not have the signature, then certain mode(s) of operation for a device or system will/will not occur. For example, the cable herein can be used to control enabling/disabling of one or more modes of operation for a certain device or system, such as but not limited to, power-up or shut-down, regular or degraded operating levels such as standby, transmission of warning or help alerts, and keys for encryption or non-encryption in distribution networks.

Figure 1:
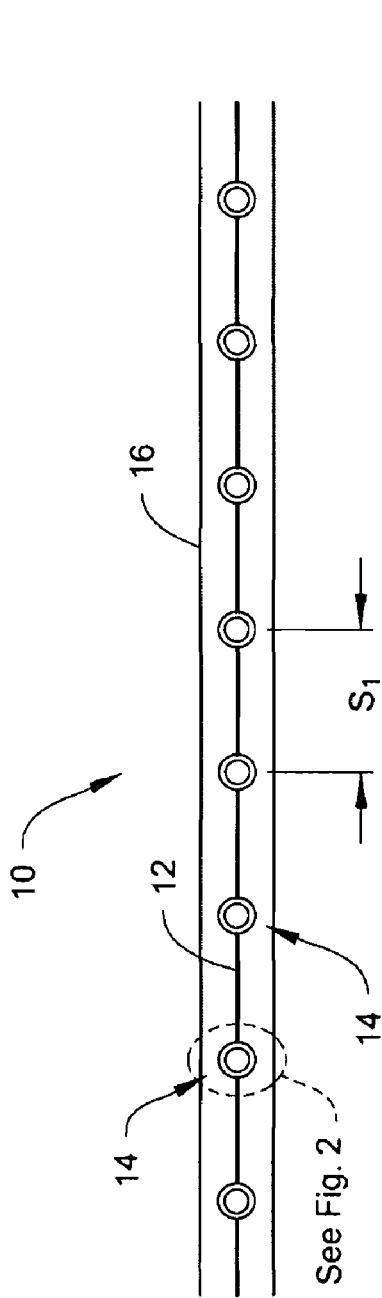
FIG. 1 is a schematic side view of one embodiment of a cable keyed with a plurality of optical events.

FIG. 1 generally shows a signal transmission cable 10 that includes a core 12, a cladding 16 over the core 12, and a plurality of optical events 14 formed on at least one of the core and cladding, such as on a surface of or within at least one of the core and cladding. In some embodiments, the core is a thick glass with an inner surface that defines a bore longitudinally extending therethrough (see e.g. FIG. 2). The cladding 16 also can be glass or a different material from the core 12, but usually the material for the cladding 16 will have a different refractive index. In many fiber optic cables, the core and the cladding are both glass but with different refractive indexes. It is known to use another material (not shown) as a jacket over both the core and cladding to provide easier handling for the end user. In some embodiments, the cable 10 is meant to be a consumable item that can be available in spools and ready for use.

As shown in the embodiment of FIG. 1, the cable 10 is a fiber optic cable, where the plurality of optical events 14 is on the core 12 and spaced along the length of the cable 10. It will be appreciated that the concepts herein are not to be limiting to fiber optic cables, but may be employed with any cable implementing optical events, including electrical cables. Between each optical event 14 is a spacing $S_1$ that may or may not be the same between the optical events. In one embodiment, the optical events 14 are 'randomly' placed throughout the length of the cable 10. By 'randomly', the placement of the optical events 14 is to be spaced and arranged such that they are unique to the cable 10. Thus, it will be appreciated that the particular placement of the plurality of optical events 14 is not meant to be limiting from cable to cable as long as each cable has its own unique placement of optical events. For example, they may all be placed on the core 12, or on the cladding 16, or a mixture of both in a variety of ways and spacings.

The plurality of optical events 14 are constructed and arranged to alter a signal transmitted through the cable. The optical events 14 together define a unique signature key of the cable 10. In some embodiments, alteration of a signal includes removal of some wavelength(s) or some power of a portion of the signal. Examples of an optical event can include a variation of the refractive index, crimp, etch, bend, break, or other surface treatment on the cable, such as on the core or cladding or both, that would cause the change in a signal transmitted through the cable. As with the particular placement of the optical events, their construction and arrangement from cable to cable is not meant to be limiting so long as each construction and arrangement of a cable's optical events is unique to that respective cable. With further reference to 'randomly', the spacing as well as the type of optical event both contribute to the uniqueness of each cable.

Figure 2:
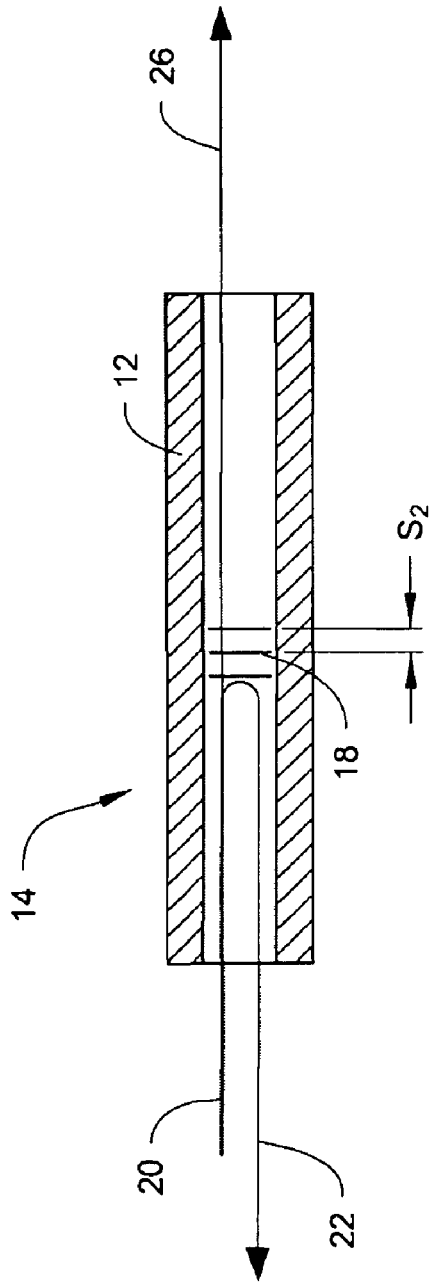
FIG. 2 is a close up side view of the cable of FIG. 1 and shows one area of optical events embedded on the cable as Fiber Bragg Gratings.

With further reference to FIGS. 1 and 2, the optical events 14 in some embodiments are embedded in the core 12 (see e.g. FIG. 2). As shown in the close-up of FIG. 2, the optical event 14 is embedded in the core 12. For ease of illustration, one optical event 14 is shown by the close-up of FIG. 2. In one embodiment, an optical event 14 is a group of fiber Bragg gratings 18 that are inscribed in the core 12 and typically across the cross section of the core 12 when viewed from one end of the bore. Each fiber Bragg grating is configured to reflect portions or all of certain wavelength(s) 22 from an input signal 20 transmitted through the cable 10 and to allow passage of certain wavelength(s) 26 through the cable 10. To achieve a unique cable, it is contemplated that each cable would have its own unique fiber Bragg grating patterning, for example using different spacings or different gratings or both.

In some embodiments, the signature key is defined by a signal reflected by the plurality of optical events 14. For example, the reflected wavelength(s) 22 and the amount of optical power reflected would be used to determine whether the correct cable is present when in use, for example, with another device or system component. It will be appreciated that the transmitted wavelength(s) 26 also may be employed as the signature key depending on what direction of the signal is used as a reference. That is, the transmitted portion (e.g. transmitted wavelength 26) of the input signal 20 may be used as the signature key downstream, for example by carrying user data signal(s). As another example, the transmitted portion of the input signal could be used a reference for comparison and/or verification of one or more other optical events that may occur downstream.

As shown, the fiber Bragg gratings 18 have a spacing $S_2$, for example between variations in their refractive index. It will be appreciated that the number of fiber Bragg gratings is not meant to be limiting, as each optical event 14 may be constructed as one fiber Bragg grating. Generally, the number of optical events 14, such as fiber Bragg gratings, depends on the signature key desired, but preferably some of the signal remains and is transmitted through the cable. In some cases, the sensitivity of equipment used to measure the signal and the overall strength of the originally transmitted signal can determine how many optical events can be used.

Fiber Bragg gratings (FBG) are well known and their operation understood. FBGs usually are constructed in a short segment of optical fiber, and function to alter a light path by reflecting particular wavelengths of light and transmitting all others. In one embodiment, this is achieved by inscribing a grating in the fiber core to provide a periodic variation to the refractive index of the fiber core. Such a structure generates a wavelength specific dielectric mirror. An FBG can therefore act as an inline optical 'filter' to block (e.g. reflect) certain, and oftentimes specific, wavelengths.

In previous uses of an FBG, wavelength separation requires a grating of high quality and precision to pull off (e.g. reflect) a certain and specific amount of optical power. In some embodiments of the concepts herein, however, there is no need to pull off so much of the optical power or even a specific amount of power from one grating. Rather, the use of a plurality of FBGs and their arrangement gives a cable its unique signature key. The use of a high quality grating may pull off an excessive amount of the wavelength or optical power, such that that the next grating may not be seen (e.g. retrieved) by measurement equipment. Thus, each of the optical events (e.g. FBG) as employed in the inventive concepts herein is constructed of lesser quality than those known in the art. By lesser quality, the optical events are constructed such that enough of the signal or its optical power remains after encountering one optical event, so that a measurement from the next optical event can be retrieved and measured and so on, while still allowing some of the signal to be transmitted through the cable. For example, each 'lower quality' FBG as contemplated herein may be constructed to reflect about 1 to 10 dB of optical power, rather than typical gratings that pull off (e.g. reflect) more of the signal, oftentimes 25-30 dB or higher. As another example, the lower quality FBG can be an order or two orders of magnitude less than that of typical gratings, for instance 10 to 20 dB less than that used for higher quality gratings.

With reference to retrieving a cable's signature key, various measuring equipment and analyzers may be used such as, but not limited to, an optical time domain reflectometer (OTDR) or a suitable spectrometer with readout processing capability.

In the example of using the reflected wavelength as the cable's signature key, the signal reflected from each embedded FBG is measured and translated into a digital value using suitable measuring equipment. The digital values from all embedded FBGs are aggregated and form a readout of the unique signature key for that cable.

For ease of description an OTDR will be described as the measuring equipment used to retrieve and process the signature key. OTDRs are well known as optoelectronic instruments used to characterize an optical fiber. An OTDR injects or transmits a series of optical pulses into a fiber usually under test conditions. It also extracts or receives, from the same end of the fiber, light that is scattered and reflected back from points in the fiber (e.g. optical events) where the index of refraction changes or light scatters out of the optical fiber. The OTDR can quantify the FBGs based on, for example, reflection amplitude, distance, time delay, and height differences. After quantifying the reflected signal, the OTDR can be configured with suitable correlation functionality and, if needed, converter functionality for comparing the result against an expected signal in making a determination whether the quantified result and expected result are the same or not. This comparison provides the basis for determining whether a certain mode of operation will be enabled or disabled.

In some embodiments, a multiple wavelength OTDR, although not required, is desirable as the measuring equipment, as the cable would have multiple gratings that may reflect different wavelengths.

Figure 3:
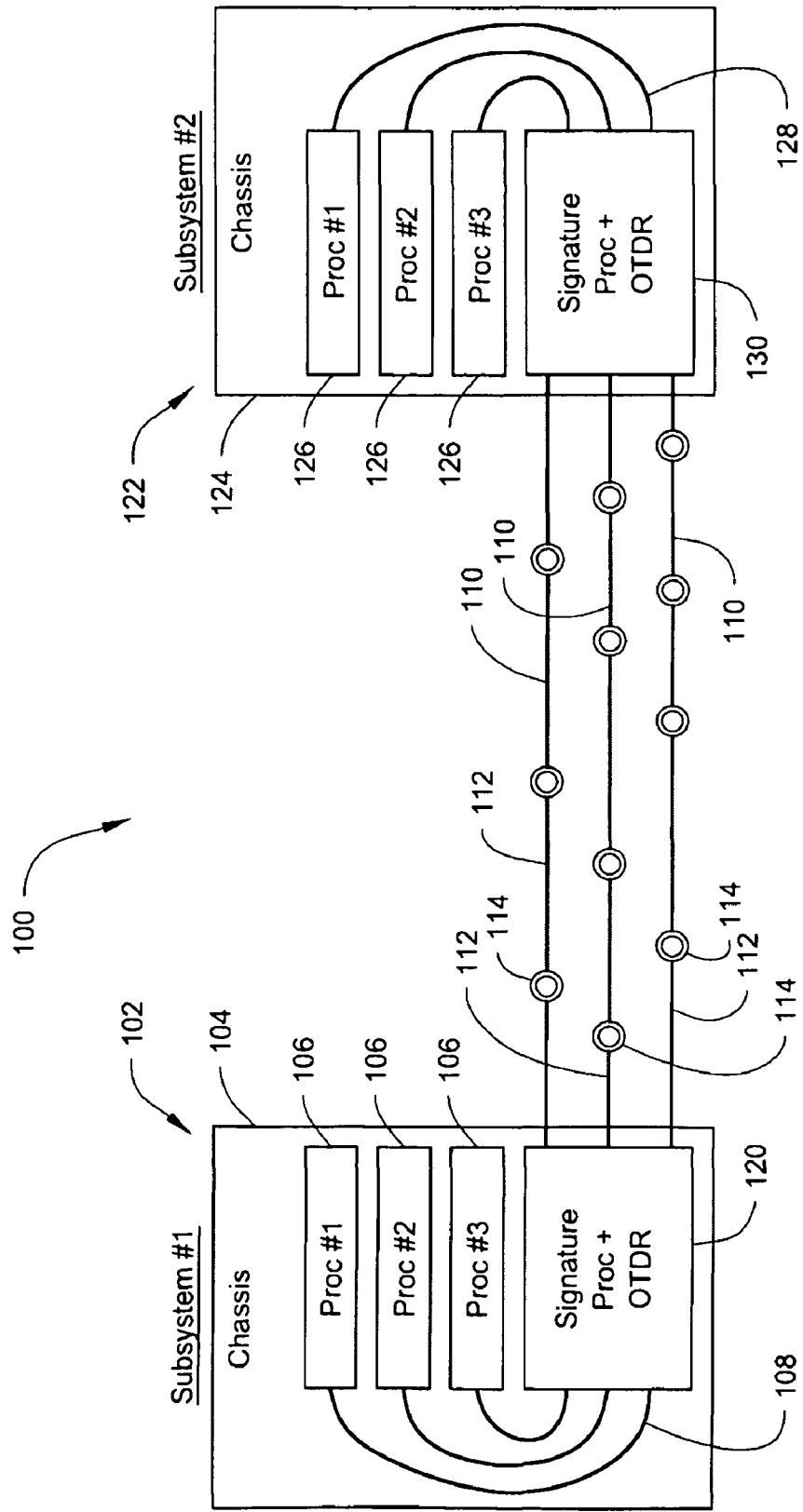
FIG. 3 is a schematic plan view of one embodiment of a system that implements one or more cables that are each keyed with a plurality of optical events.

FIG. 3 shows one embodiment of a system 100 implementing the cable concepts described herein. The embodiment of FIG. 3 shows two subsystems 102, 122, for example, in a distribution network of processors. The general layout shown in FIG. 3 can be used in avionics applications for aircraft, for example where subsystem 102 is located in the front section of an aircraft, and the other subsystem 122 is located in the rear of the aircraft. It will be appreciated that the specific layout of FIG. 3 is not meant to be limiting and only represents one implementation for the cable concepts in this application.

As shown, subsystem 102 is constructed and arranged to include one or more electronic devices 106. Each device 106 is configured with a mode of operation and that is enabled or disabled by receiving its own operative signal. The devices 106 can include, but are not limited to, processing cards, data storage devices, and control processing units. The devices 106 are supported and oftentimes enclosed in a chassis 104.

The other subsystem 122 also includes its respective device(s) 126 supported in a chassis 124. Each subsystem 102, 122 shows three respective devices 106, 126 as processing cards, but it will be appreciated that the number of devices is not meant to be limiting as one device or more than three devices may be part of the subsystem and chassis. It also will be appreciated that more than two subsystems may be employed in the overall system 100 and may be at one locale (e.g. same aircraft), for example in avionics applications.

Fiber optic cables 110 are configured as a path for signal transmission to and from each device 106, 126. Generally, such cables are configured for unidirectional signal transmission, but can be configured for bidirectional transmission as well. The fiber optic cables 110 include a core 112 and a cladding over the core (cladding not shown but can be same as described in FIG. 1). Each cable 110 has its own plurality of optical events 114 embedded in an inner surface of the core. As described above, the plurality of optical events are constructed and arranged to alter a signal transmitted through the cable 110. And, the plurality of optical events 114 defines a signature key for each cable 110 that is unique to the operative signal of its respective device 106, 126. A plurality of fiber Bragg gratings may be employed as the plurality of optical events.

A processor 120, 130 is connected to each of the respective devices 106, 126 through suitable wiring 108, 128. In one embodiment, each processor 120, 130 is configured to determine whether the operative signal is received. When the correct fiber optic cable is connected to the system 100, each processor 120, 130 will receive the operative signal and is configured to transmit the operative signal to the respective device 106, 126 of the respective subsystem 102, 122. In some embodiments, the processors 120, 130 can be an OTDR or any suitable spectrometer.

To retrieve the signature key from the respective cables 110, FIG. 3 shows processing principles similarly employed with an OTDR, for example. Each subsystem 102, 122 employs its own processor 120, 130 (e.g. OTDR) to process a reflected signal and then determine whether the cable has the proper signature key. That is, each processor 120, 130 transmits a signal through each cable 110 and, if the correct signal is reflected back to the respective processor 120, 130, then a desired mode of operation of the respective three devices 106, 126 can resume.

With the above concepts in mind, retrofit applications are possible without the need to replace expensive processing equipment or with little modification of the chassis structure. For example, cables 110 can be easily replaced or updated and a chassis can be modified with an extra support or slot to accommodate a processor such as an OTDR.

With further reference to FIG. 3, the signature key is defined by a signal reflected by the plurality of optical events 114. Similar to the descriptions above for FIG. 2, the system of FIG. 3 uses reflected wavelength(s) and an amount of lost optical power to determine whether the correct cable is present when in use, for example, with another device or system component. It also will be appreciated that the wavelength(s) and optical power transmitted may be employed as the signature key downstream depending on what direction of the signal is used as a reference. That is, the transmitted portion of an input signal may be used as the signature key downstream, for example by carrying user data signal(s) for a device or system downstream. As another example, the transmitted portion of the input signal could be used a reference for comparison and/or verification of one or more other optical events that may occur further downstream. In such alternatives, it is possible that in the system 100 of FIG. 3, the processor of one subsystem could be configured to respond to a signal transmitted from the processor of the other subsystem.

Thus, in one embodiment of implementation, retrieving the signature key can be useful for controlling a mode(s) of operation in an electronic device or system. As discussed in the concepts above, a signal is transmitted through a cable. If the cable with the correct signature key is being used, then an operative signal is separated from the transmitted signal based on the signature key, since the signature key is unique to the operative signal. A processor, such as an OTDR, receives the operative signal. The processor is configured to determine whether the operative signal is received. If the correct cable is installed then the correct operative signal would be received, and the operative signal is then transmitted to the electronic device to enable or disable a mode of operation.

As described, the cable herein, with its plurality of optical events forming the signature, can be implemented with various devices and systems to provide a valuable security function. The keyed cable with its signature, for example, protects against the replacement of the keyed cable with a cable other than the same keyed cable. If the keyed cable is replaced with a cable that does not have the signature, then certain mode(s) of operation for a device or system will/will not occur. The concepts herein can be used to control enabling/disabling of certain device or system operations, such as but not limited to, power-up or shut-down, regular or degraded operating levels such as standby, transmission of warning or help alerts, and keys for encryption or non-encryption in distribution networks.

That is, the inventive concepts herein can provide a technique for the detection of substitute cables, such as when an intended environment has changed and a cable needs replacement or repair. General applications can include, for example data security, information assurance, and optical networking. Such tamper detection capability is helpful to determine whether a device or system has been altered or even removed from its intended operational environment. As one example, the techniques herein can detect an unauthorized cable splice (e.g. where a jumper is placed between FBGs that alters the lightpath), for instance to determine whether an eavesdrop attack has occurred, or provide information assurance to determine whether eavesdrop equipment has been connected to the optical cable. Also, the concepts herein can be used for subsystem authentication, information assurance, used as a seed key for authentication between subsystems. In yet other examples, other applications of the concepts herein are for use in commercial network devices/infrastructure manufactures, embedded computer manufactures, platform integrators such as for a defense department or military aircraft.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fiber optic cable comprising:
a core;
a cladding over the core; and
a plurality of optical events on at least one of the core and cladding,
the plurality of optical events constructed and arranged to define a signature key of the fiber optic cable that controls one or more modes of operation of a device or system,
the plurality of optical events are constructed and arranged to alter a signal transmitted through the fiber optic cable to define the signature key, the signature key is unique to an operative signal that enables or disables the one or more modes of operation.

2. The fiber optic cable of claim 1, wherein the plurality of optical events are embedded on an inner surface of the core.

3. The fiber optic cable of claim 1, wherein the plurality of optical events comprises a plurality of fiber Bragg gratings.

4. The fiber optic cable of claim 3, wherein each of the fiber Bragg gratings configured to reflect portions or all of certain wavelengths from an input signal transmitted through the fiber optic cable and to allow passage of other wavelengths through the fiber optic cable.

5. The fiber optic cable of claim 1, wherein the signature key is defined by a signal reflected by the plurality of optical events.

6. A method of keying a fiber optic cable comprising:
forming an optical event on a cable, the optical event being formed on one of a core of the cable or a cladding of the cable; and
forming another optical event on the cable, the another optical event being formed on one of the core of the cable or the cladding of the cable,
the steps of forming comprise constructing and arranging the optical events to define a signature key of the cable that controls one or more modes of operation of a device or system, and constructing and arranging the optical events to alter a signal transmitted through the cable to define the signature key,
wherein the signature key is unique to an operative signal that enables or disables the one or more modes of operation.

7. The method of claim 6, wherein the step of forming the optical events comprises embedding the optical events on an inner surface of the core.

8. The method of claim 6, wherein the step of forming the optical events comprises inscribing fiber Bragg gratings on the core, each of the fiber Bragg gratings configured to reflect portions or all of certain wavelengths from an input signal transmitted through the cable and allow passage of other wavelengths through the cable.

9. A system comprising:
an electronic device configured with a mode of operation that is enabled or disabled by receiving an operative signal;
a fiber optic cable configured as a path for signal transmission to and from the device, the fiber optic cable comprising a core, a cladding over the core, and a plurality of optical events on at least one of the core and cladding, the plurality of optical events constructed and arranged to define a signature key of the fiber optic cable that controls the mode of operation of the electronic device, the plurality of optical events are constructed and arranged to alter a signal transmitted through the fiber optic cable to define the signature key, the signature key is unique to an operative signal that enables or disables the mode of operation; and
a processor connected to the device, the processor configured to determine whether the operative signal is received, and when the fiber optic cable is connected to the system, the processor is configured to receive the operative signal and transmit the operative signal to the device.

10. The system of claim 9, wherein the device comprises one or more of a processing card, a data storage, and a control processing unit.

11. The system of claim 9, wherein the plurality of optical events are embedded on an inner surface of the core.

12. The system of claim 9, wherein the plurality of optical events comprises a plurality of fiber Bragg gratings, each of the fiber Bragg gratings configured to reflect portions or all of certain wavelengths from an input signal transmitted through the fiber optic cable and allow passage of other wavelengths through the fiber optic cable.

13. The system of claim 9, wherein the signature key is defined by a signal reflected by the plurality of optical events, and the reflected signal corresponds to the operative signal.

14. The system of claim 9, wherein the processor comprises one of an optical time domain reflectometer or a spectrometer.

15. The system of claim 9, further comprising an additional one or more fiber optic cables, each of the additional one or more fiber optic cables comprises a core, a cladding over the core, and a plurality of optical events on at least one of the core and cladding, wherein at least one of the additional one or more fiber optic cables has a different signature key from the fiber optic cable of claim 9.

16. The system of claim 15, wherein at least one of the additional one or more fiber optic cables has the plurality of optical events constructed and arranged with at least one of a different spacing and a different number of optical events relative to the fiber optic cable of claim 9.

17. The system of claim 9, further comprising a plurality of subsystems,
wherein the electronic device, the fiber optic cable, and the processor of claim 9 comprise one subsystem,
another subsystem comprises an electronic device, a fiber optic cable, and a processor, the another subsystem is connected to the one subsystem through the fiber optic cables of the one subsystem and the another subsystem,
wherein in the another subsystem,
the electronic device configured with a mode of operation enabled or disabled by receiving an operative signal,
the fiber optic cable configured as a path for signal transmission to and from the electronic device, and comprising a core, a cladding over the core, and a plurality of optical events on at least one of the core and cladding, the plurality of optical events constructed and arranged to define a signature key of the fiber optic cable that controls the mode of operation of the electronic device, the plurality of optical events are constructed and arranged to alter a signal transmitted through the fiber optic cable to define the signature key, the signature key is unique to an operative signal that enables or disables the mode of operation, the processor connected to the electronic device, the processor configured to determine whether the operative signal is received, and when the fiber optic cable is connected to the system, the processor is configured to receive the operative signal and transmit the operative signal to the electronic device.

18. The system of claim 17, wherein the processor of the another subsystem is configured to respond to a signal transmitted from the processor of the one subsystem.

19. The system of claim 17, wherein the plurality of subsystems are avionics subsystems each supported by a chassis, where one of the subsystems configured to be in the front of an aircraft, and another of the subsystems configured to be in the rear of the aircraft.

* * * * *